(12) United States Patent
Mohadjer et al.

(10) Patent No.: US 12,474,211 B2
(45) Date of Patent: Nov. 18, 2025

(54) DEVICE AND METHOD FOR DETECTING BY MEASUREMENT FIRE-LIKE EVENTS, AND SYSTEM FOR ELIMINATING A HAZARDOUS STATE CAUSE BY A FIRE-LIKE EVENT

(71) Applicant: Fagus-GreCon Greten GmbH & Co. KG, Alfeld (DE)

(72) Inventors: Amin Mohadjer, Hannover (DE); Michael Mehlhorn, Bad Gandersheim (DE); Mario Haas, Hildesheim (DE)

(73) Assignee: Fagus-GreCon Greten Gmbh & Co. KG, Alfeld (DE)

( * ) Notice: Subject to any disclaimer, the term of this patent is extended or adjusted under 35 U.S.C. 154(b) by 38 days.

(21) Appl. No.: 18/249,100

(22) PCT Filed: Oct. 13, 2021

(86) PCT No.: PCT/EP2021/078339
§ 371 (c)(1),
(2) Date: Apr. 14, 2023

(87) PCT Pub. No.: WO2022/079111
PCT Pub. Date: Apr. 21, 2022

(65) Prior Publication Data
US 2024/0003745 A1    Jan. 4, 2024

(30) Foreign Application Priority Data

Oct. 15, 2020    (DE) .................... 10 2020 127 219.7

(51) Int. Cl.
*G01J 5/00* (2022.01)
*A62C 37/36* (2006.01)
(Continued)

(52) U.S. Cl.
CPC ............ *G01J 5/0018* (2013.01); *A62C 37/04* (2013.01); *G01J 1/4204* (2013.01); *G08B 17/12* (2013.01)

(58) Field of Classification Search
CPC ....... G01J 5/0018; G01J 1/4204; A62C 37/04; G08B 17/12
(Continued)

(56) References Cited

U.S. PATENT DOCUMENTS 4,691,196 A * 9/1987 Kern ....................... F23N 5/082
250/339.15
5,473,162 A * 12/1995 Busch .................... G01N 21/72
250/339.08

(Continued)

FOREIGN PATENT DOCUMENTS

DE         10124280 A1    12/2002
DE    202013006142 U1     9/2013
(Continued)

OTHER PUBLICATIONS

PCT/EP2021/078339 International Search Report mailed Jul. 6, 2022.
DE102020127219.7 Search Report mailed Aug. 11, 2021.

*Primary Examiner* — Brian A Zimmerman
*Assistant Examiner* — Thang D Tran
(74) *Attorney, Agent, or Firm* — Wood Herron & Evans LLP (57) ABSTRACT

Metrological detection of a fire-like phenomenon, in particular a spark, flame or embers or hot particles using a first and a second measuring unit for the detection of electromagnetic radiation emitted by the fire-like phenomenon in a first or second wavelength range, respectively, optionally comprising a third measuring unit for detecting ambient light as well as optionally comprising a sensor unit for the measurement of media-specific or environment-specific (Continued)

measurement data. A checking means is adapted to check at a current time point (tA) on the basis of measurement data recorded by the measurement arrangement and/or stored medium- or environment-specific characteristic data, whether an adjustment criterion (A) is satisfied, and if the adjustment criterion (A) is satisfied, adjust a measurement sensitivity (M1, M2, M3) or an operating parameter (P1, P2, P3) of at least one of the measuring units.

2 Claims, 4 Drawing Sheets

(51) Int. Cl.
*G01J 1/42* (2006.01)
*G08B 17/12* (2006.01)

(58) Field of Classification Search
USPC .......................................................... 340/577
See application file for complete search history.

(56) References Cited

U.S. PATENT DOCUMENTS

| | | | | |
|---|---|---|---|---|
| 6,186,241 | B1* | 2/2001 | Murr | A62C 3/006 169/65 |
| 7,985,953 | B2* | 7/2011 | Luterotti | G01J 5/08 250/353 |
| 2002/0186128 | A1* | 12/2002 | Amano | G08B 17/06 340/584 |
| 2004/0183021 | A1* | 9/2004 | Luck | G08B 17/12 250/347 |
| 2005/0287033 | A1* | 12/2005 | Thurbide | G01N 21/72 422/51 |
| 2006/0181407 | A1* | 8/2006 | Tice | G08B 17/00 340/630 |
| 2006/0218987 | A1* | 10/2006 | Campman | G01N 33/0047 73/23.2 |
| 2008/0296502 | A1* | 12/2008 | Kudoh | F23N 5/082 250/349 |
| 2010/0077840 | A1* | 4/2010 | Srivastava | G01N 33/0034 356/51 |
| 2010/0289650 | A1* | 11/2010 | Dittmer | G08B 17/113 340/578 |
| 2012/0001760 | A1* | 1/2012 | Harchanko | G08B 17/12 340/578 |
| 2013/0033377 | A1* | 2/2013 | Hoseit | G08B 17/10 340/539.22 |
| 2013/0278930 | A1* | 10/2013 | Liu | G01N 21/718 356/318 |
| 2014/0283144 | A1* | 9/2014 | Gettings | G08B 23/00 726/30 |
| 2016/0019780 | A1* | 1/2016 | Gettings | G08C 17/02 342/357.29 |
| 2017/0108381 | A1* | 4/2017 | Waldron | G08B 29/185 |
| 2017/0147884 | A1* | 5/2017 | Lorenzoni | G01J 5/07 |
| 2019/0168047 | A1* | 6/2019 | Conboy | A62C 37/38 |
| 2019/0294165 | A1* | 9/2019 | Hofmann | A62C 3/0221 |
| 2020/0105114 | A1* | 4/2020 | Weiss | G01N 15/0205 |
| 2020/0391061 | A1* | 12/2020 | Enejehlm | B25J 19/02 |
| 2021/0020882 | A1* | 1/2021 | Coreth | G08B 29/188 |

FOREIGN PATENT DOCUMENTS

| | | |
|---|---|---|
| DE | 102017005386 A1 | 12/2018 |
| WO | 98055014 A1 | 12/1998 |
| WO | 2003012381 A1 | 2/2003 |
| WO | 2003102494 A2 | 12/2003 |

* cited by examiner

DEVICE AND METHOD FOR DETECTING
BY MEASUREMENT FIRE-LIKE EVENTS,
AND SYSTEM FOR ELIMINATING A
HAZARDOUS STATE CAUSE BY A
FIRE-LIKE EVENT

This application is a US National Phase of PCT Application Serial Number PCT/EP2021/078339 filed Oct. 13, 2021, which published as PCT Publication WO2022/079111, and claims priority to German application serial no. 10 2020 127 219.7 filed Oct. 15, 2020, both of which are hereby incorporated by reference herein in their entirety The present invention relates to an apparatus for metrological detection of fire-like phenomena, in particular a spark, flame, embers or hot particle phenomenon in a reservoir through which media flows or which is loaded with media. The present invention further relates to a method for the metrological detection of such fire-like phenomena using an apparatus according to the invention. Finally the invention comprises a system for eliminating a hazardous state produced by a fire-like phenomenon in a reservoir through which medium flows or which is loaded with media.

Apparatus for the metrological detection of fire-like phenomena, also designated as spark sensors or spark detectors in technical jargon, are used in various areas of application in order to detect fire-like phenomena and fire initiators at an early stage and thus be able to contribute to an effective, fire, combustion or explosion prevention.

Spark detectors can be embedded in system-integrated alarm or extinguishing systems or used decoupled from an alarm or extinguishing system, for example, exclusively for monitoring a reservoir through which media flows or which is loaded with media.

In the present context, a medium can be understood in particular as solids, solid particles, dust particles etc. When such materials or particles are moved, in particular at increased or reduced pressure values compared with normal pressure, the risk of the occurrence of fire-like phenomena and therefore also the risk of flame formation, a fire or an explosion (e.g. a dust explosion) increases.

A reservoir "loaded" with a medium can be understood, for example, as a container (e.g. a silo or a storage chamber) supplied with a bulk solid, bulk particles or bulk granules in which the medium is held without active transport (i.e. without active induction of movement) and—if at all—gravity-based movements of the medium occur.

A reservoir "through which medium flows" can be understood as an (at least partially) outwardly closed conveyor path, a conveyor line, a conveyor belt, chute, a filter, a filter system or a conveyor channel in which a flow of a medium is present and a medium is transported (e.g. mechanically or pneumatically). In a reservoir through which a medium flows the medium is therefore predominantly in a moving state. Depending on the type of medium, the flow velocity of the medium and the shape and size of the reservoir, local particle accumulations, deflagrations etc. can occur as a result of media movements, for example, turbulence (in particular in the case of turbulent flow), which can overall result in increased friction between the particles pertaining to the medium amongst one another and between the particles and walls of the reservoir. An increased evolution of frictional heat can be associated with this.

Such storage of media or movement of media occurs particularly frequently in manufacturing, processing or transport processes in the wood-processing industry, textile industry, furniture industry, coal industry, food industry, luxury food industry (in particular tobacco industry), animal feed industry, leather industry, rubber industry, chemical industry as well as in the black powder and fire additives industry. Plants for grinding or comminuting solids or mixtures of solids, drying plants, cooling plants, pressing plants, all with their pneumatic or mechanical transport and suction paths, are frequently found in the said industrial fields.

An increased risk of fire, conflagration or explosion is common to the previously mentioned areas of application or application examples. This is usually the case when fine particles of combustible (e.g. organic) material are present or moved in a reservoir in high particle density. If a fire-like phenomenon then occurs in a part of the system or machine connected to the reservoir or in the reservoir itself (e.g. spark formation, flame formation, ember formation or hot particle formation), which was induced, for example, by contaminants, metal particles, stones, etc., this can lead to the said spark formation together with the associated ignition of the medium (as far as an explosion). This can be intensified by the aforesaid movement-induced turbulence, deflagration and heating effects of the media particles.

A fire-like phenomenon can certainly be detected at an early stage by means of a spark detector but a potentially ensuing hazardous situation (e.g. a fire or an explosion) cannot be prevented by this alone. Effective prevention can only take place if fire-like phenomena detected by a spark detector are evaluated with regard to the probability of triggering an actual hazardous situation (i.e., a fire or an explosion), i.e., with regard to their potential risk of triggering a fire or risk of triggering an explosion so that subsequently—if necessary—further steps to eliminate the risk can be initiated. Finally—if the fire-like phenomenon is not expected to come to an end of its own accord—in order to effectively combat or prevent a fire or an explosion, an extinguishing process of the fire-like phenomenon must be set in motion. For this purpose, spark detectors are frequently coupled with suitable alarm systems, extinguishing systems or switch-off systems.

For this purpose, a spark detector can be installed in a wall of a reservoir or arranged near a radiation-permeable pane of a reservoir (e.g. a pipeline or a duct) in such a manner that a fire-like phenomenon inside the reservoir can be detected—e.g. optically—using the spark sensor. If spark formation is detected, this can be passed on to an extinguishing centre, for example, whereupon an extinguishing device in the reservoir is activated using an automatic extinguishing system and sparks, embers, hot particles or a fire that have occurred are extinguished. At the same time, simply triggering an alarm can contribute to manually extinguishing the source of the fire or explosion.

Hereinafter, reference is made to selected spark detectors known previously from the prior art and their mode of operation is briefly explained. DE 20 2013 006 142 U1 discloses a detector for detecting sparks, fire and pockets of embers, which can detect flashes of light in the visible spectral range or, alternatively, thermal radiation in the infrared spectral range. For this purpose, the detector is inserted into a pipe wall with a socket having a translucent disc. The electromagnetic radiation to be detected is guided to a photo-sensitive element of the detector via a light guide arranged under the pane. The detected signals can then be evaluated.

However, since panes of this type can become contaminated and reliable detection of sparks, fire and pockets of embers can thus be impaired, arrangements and methods have been described in the prior art with which such contamination can be detected at an early stage.

A method is known from WO 03/012381 A1, in which two detectors inserted diametrically opposite one another in a pipe wall are provided. To check the functional reliability of the detectors, a test signal is emitted from a transmitter of one detector, which is at least partially picked up by a receiver of the opposite detector. From this, conclusions can be drawn regarding the functional reliability of the detector. A disadvantage, however, is the need for the diametrically opposed arrangement of precisely two spark detectors. Accordingly, the provision of such a system is associated with increased costs and increased installation effort.

The publication DE 10 2017 005 386 A1, which can be ascribed to the applicant of the present invention, is directed to a method for monitoring a material flow in a pipeline, which uses at least one detector with a translucent pane, wherein at least one light-sensitive sensor is arranged under the translucent pane. The detector can detect sparks, fire or pockets of embers in at least a first spectral range and detect contamination of the pane in a second spectral range of a shorter wavelength that is spaced apart from the first.

In addition to guaranteeing the basic functionality of a spark detector (e.g. through an integrated contamination detection), it is of particular importance for the aforesaid applications to ensure sufficient functional reliability and measurement precision. It is of particular interest to completely avoid false alarms as far as possible and to enable a situation- or media-adapted detection of fire-like phenomena. It is therefore desirable to compensate as completely as possible for those effects caused by the medium, the reservoir or the environment and which negatively affect the detection.

The avoidance of false alarms is of enormous importance, since an alarm can frequently be accompanied by the shutdown of machines, systems or even an entire production hall. Furthermore, machines or systems can be damaged by the use of extinguishing agents. If this is a false alarm, this can result in unnecessary costs, damage, etc.

As already mentioned initially, a media particle density present in the reservoir at a certain time point, the type and condition of the medium, or an environmental parameter (e.g. the temperature or pressure) can influence the probability of the generation of a fire-like phenomenon (and a possible ensuing fire or explosion event). It is of great interest to consider such situation- or media-related parameters when assessing the risk from measurement data obtained with a spark detector. This is because not every fire-like phenomenon detected with a spark detector immediately substantiates a risk of a fire or explosion. For example, with certain media it can be usual or even desirable that fire-like phenomena occur, up to a certain extent, in a reservoir holding the medium.

Furthermore, with spark detectors and associated alarm systems, there is a particular need for a situation- and media-adapted performance setting of the spark detectors, on the one hand, to increase their measurement precision and on the other hand, to avoid blind spot measurements, i.e. to avoid the situation where fire-like phenomena occurring in certain wavelength ranges cannot be detected in a certain spectral range due to a lower measurement sensitivity.

Accordingly, it is the object of the present invention to provide an apparatus and a method for the metrological detection of fire-like phenomena in a reservoir through which media flows or which is loaded with media, whereby the risk of false alarms is reduced and the detection and risk assessment of fire-like phenomena is improved. Furthermore, a system is proposed for the needs-based and reliable elimination of a hazardous state produced by a fire-like phenomenon in a reservoir through which media flows or which is loaded with media.

It should be pointed out that the features listed individually in the claims can be combined with one another in any technically meaningful way and show further embodiments of the invention. The description additionally characterizes and specifies the invention, in particular in connection with the figures.

It should also be pointed out that a conjunction "and/or" used herein, standing between two features and linking them to one another, should always be interpreted in such a manner that in a first embodiment of the subject matter according to the invention only the first feature can be present, in a second embodiment only the second feature can be present and in a third embodiment both the first and the second feature can be present.

The present invention relates to an apparatus for the metrological detection of a fire-like phenomenon, in particular a spark, flame, embers or hot particle phenomenon, in a reservoir through which media flows or which is loaded with media, comprising a measurement arrangement configured to record measurement data, the measurement arrangement comprising a first and a second measuring unit for detecting electromagnetic radiation emitted by the fire-like phenomenon in a first or second wavelength range, optionally comprising a third measuring unit for recording ambient light and optionally comprising a sensor unit for measuring media-specific or environment-specific measurement data. The term "comprising" should be understood in the present case in the sense of "having".

The apparatus according to the invention is characterized by a checking means that is adapted to check at a current time point on the basis of measurement data recorded by the measurement arrangement and/or stored medium- or environment-specific characteristic data, whether an adjustment criterion is satisfied, wherein if the adjustment criterion is satisfied, a measurement sensitivity or an operating parameter of at least one of the measuring units can be adjusted adequately for the situation using a control means.

It is essential for the present invention that as a result of the (adequate for the situation) measurement sensitivity or operating parameter adjustment disclosed according to the invention it is possible to effectively distinguish between dangerous and harmless fire-like phenomena on the one hand and between dangerous fire-like phenomena and harmless ambient light on the other hand. False alarms are thus avoided by intelligent detection technology. The measurement sensitivity or operating parameters can also be adapted to an individual case of application (e.g. use in a production plant for tobacco or gunpowder production) and the associated media or environment-specific requirements so that a detected fire-like phenomenon can be evaluated with a view to the risk of ignition of a fire or explosion, taking into account the specific circumstances. This is because—depending on the area of usage or particular application—not every fire-like phenomenon detected is associated with an increased danger of fire or explosion as it were. The probability of false alarms caused by measurement technology can also be significantly reduced with an apparatus according to the invention. Accordingly, an apparatus according to the invention enables a detection of fire-like phenomena that is adapted to the hazard situation, as a result of which unnecessary false alarms are avoided. With the present invention, the measurement sensitivity of those measuring units pertaining to an apparatus according to the invention can be flexibly re-adjusted or relevant threshold values can be adapted depending on an adjustment criterion.

According to the invention, an apparatus for the metrological detection of a fire-like phenomenon is initially claimed. An "apparatus" can be understood to mean a physical object that can be composed of one or more physical components. An apparatus can have a mechanical, electrical, metrological or other function. Furthermore, an apparatus can comprise a housing in which the components pertaining to the apparatus can be arranged. An apparatus can also be composed of a plurality of physical components which are arranged separately, i.e., at a distance from one another. The components can also be arranged directly adjacent to one another. Components can be connected to one another other mechanically, by signal technology and/or electrically. Computing units, servers, means of communication, communication interfaces, microcontrollers, processing or control boards and other functional components can also be part of an apparatus or provide an apparatus. Programs, applications, application software, software, routines, algorithms, etc. can be executed on an apparatus or an apparatus component.

A "metrological detection" of a fire-like phenomenon can be understood as a detection of radiation emitted by the fire-like phenomenon (e.g. emitted radiation). The radiation can be detected wavelength-selectively or in predefined spectral ranges, i.e., wavelength ranges. For example, wavelength-dependent radiation intensities (e.g. in the form of spectral peaks) can be detected. A "detection" can be understood not only as the detection as such but also as an (at least temporary) recording, i.e., recording or storage, of the data. The presence of a fire-like phenomenon can be concluded through characteristic wavelengths, wavelength ranges, radiation intensities, peak or curve properties or curve shapes of the recorded radiation data. Such a conclusion can also require an evaluation of the recorded data. Measuring units with photosensitive elements, e.g., photodiodes, are primarily used to record the radiation emitted by the fire-like phenomenon. The radiation of a fire-like phenomenon received there can be recorded in the form of generated voltages. The intensity value of the voltages can be proportional to the intensity of the radiation intensity present at a specific wavelength or in a wavelength range. Measurement data recorded in this way can firstly undergo a pre-processing for a qualitative or quantitative evaluation in relation to a fire-like phenomenon. The recorded data (e.g., raw data) can be converted into a desired data format or a data representation.

In the present context, a "fire-like phenomenon" can be understood in particular as optically perceptible spark, flame or ember phenomenon. However, flash-like phenomena, ember pockets, spark or flame accumulations can also be understood as fire-like phenomenon. A flame, a fire or a micro-explosion can also be understood as fire-like phenomenon. A high-temperature particle, i.e. a hot particle (so-called hot particle) can also constitute a hot particle phenomenon as it were which, in the context of the present invention, can also be understood as optically perceptible fire-like phenomenon. Hot particles can, for example, be welding beads or machine parts that have fallen off, which heat up due to friction and can assume correspondingly high temperatures. Metallic contaminants in wood processing or wood recycling, which are heated and transported in comminution processes in addition to the usual flying sparks, can also be understood as hot particles.

The term "optically perceptible" here means that the fire-like phenomenon can be detected optically due to electromagnetic radiation emitted by the fire-like phenomenon, e.g., by one of the measuring units. A "fire-like phenomenon" can represent an ignition initiator or an explosion initiator. Fires, conflagrations, accumulations of embers, pockets of embers, sources of flames, etc. can develop from a fire-like phenomenon with enormous potential for damage to machines, systems and people. Depending on the type of fire-like phenomenon (spark, flame, embers, hot particles, etc.) and the temperature of the fire-like phenomenon, fire-like phenomena emit electromagnetic radiation in different wavelength ranges.

As mentioned, the invention relates to the detection of fire-like phenomena in a "reservoir through which media flows or which is loaded with media". In the present context, a "medium" can be understood to mean solids, solid particles, mixtures of different solids or solid-particle mixtures, dust particles, etc. The medium can have solid particles of different particle sizes. The medium can also contain liquid or gaseous components. A medium can also be understood to mean solids which at least partially change their state of aggregation during transport, or which undergo changes in relation to their shape and/or consistency. It can also comprise a pasty, gel-like medium. In principle, it is also conceivable to use the present invention with media that are present in the reservoir in a liquid or gaseous state or are transported through it, as long as fire-like phenomena occur and these can be detected by measurement (optical). If such substances or particles are moved, particularly at elevated or reduced pressures compared to normal pressure, the risk of the occurrence of fire-like phenomena and thus also the risk of a flame formation, a fire or an explosion (e.g. a dust explosion) increases. This is exacerbated by dirt, dust, foreign particles, metal particles brought in by machine or system components or even a direct introduction of a spark that can spread in the reservoir.

A "reservoir" loaded with a medium can—as already mentioned initially—be understood, for example, as a container supplied with bulk solids, bulk particles or bulk granular material (e.g. a silo or a storage chamber) in which the medium is held without active transport (i.e. without active induction of movement) and, if at all, gravity-based movements of the medium occur. The same can apply to the previously described further forms of media which have a state of aggregation other than the solid state.

A reservoir "through which media flows" can be understood as an (at least partially) outwardly closed conveyor path, a conveyor line or a conveyor channel in which a media flow of a medium is transported (e.g., mechanically or pneumatically). A conveyor channel provided with a conveyor screw can also be regarded as a reservoir through which media flows. Likewise, a chute, a filter, a filter system or a conveyor belt can provide a reservoir through which media flows. In a reservoir through which media flows, the medium is therefore primarily in a moving state. Depending on the type of medium, the flow rate of the medium and the shape and size of the reservoir, local particle accumulations, deflagrations etc. can occur as a result of media movements, for example, turbulence (in particular in the case of turbulent flow), which can overall result in increased friction between the particles pertaining to the medium amongst one another and between the particles and walls of the reservoir. An increased evolution of frictional heat can be associated with this. This can be exacerbated by dirt, dust, foreign particles, metal particles introduced by machine or plant components or even a direct introduction of a spark that can spread in the reservoir.

As mentioned, an apparatus according to the invention comprises a measurement arrangement which is configured to acquire measurement data. The term "measurement arrangement" is to be understood to mean that it can be an arrangement of a plurality of units designed to acquire measurement data, in the present case the first, second and third measuring unit and the sensor unit. It should be expressly emphasized that the sensor unit also comprises a measuring unit in the functional sense, the term "sensor unit" was used in the present case to emphasize its optional presence. However, a measurement arrangement can also exclusively comprise a measuring unit. The measuring units or the sensor unit can, when taken by themselves, in each case have one or more measuring or sensor elements. The measuring units preferably each have at least one radiation-sensitive electrical component. For example, this can be a photodiode or a photoresistor.

The first measuring unit is configured to detect electromagnetic radiation emitted by the fire-like phenomenon in a first wavelength range. The first wavelength range can extend from 100 nm-1500 nm, and preferably from 750 nm-1200 nm, wherein the measurement sensitivity optimum of the first measuring unit lies in a wavelength range of approximately 950 nm, preferably exactly 950 nm. The first measuring unit preferably comprises an Si-based measuring element, e.g., an Si-based semiconductor, which can be part of a photodiode. It can additionally be provided that the first measuring unit comprises a plurality of Si-based measuring elements. The first measuring unit has an excellent sensitivity (sensitivity) to fire-like phenomena (in particular sparks) having a temperature of >1000° C. The first measuring unit can therefore comprise a classic spark measuring unit. In a wavelength range of >1000 nm, the first measuring unit has a rather low measurement sensitivity. However, it is advantageous that the measurement signals recorded with the first measuring unit can be amplified relatively well. The amplification can take place via a classic analogue or digital signal amplification (e.g., using an amplification module). At the same time, however, an error threshold stored for the first measuring unit or a stored threshold value for triggering a danger signal can also be adjusted. This can also be understood as "adjustment of a measurement sensitivity". Although the first measuring unit is only weakly sensitive to electromagnetic radiation >1000 nm, if the measurement signal is amplified sufficiently, those signals recorded in this wavelength range using the first measuring unit with a low signal weakness can be amplified to the effect that qualitative and/or quantitative information on fire-like phenomena which emit electromagnetic radiation in this wavelength range can be obtained from the amplified measurement data.

The second measuring unit is configured to detect electromagnetic radiation emitted by the fire-like phenomenon in a second wavelength range. The second wavelength range can be 1000 nm-3500 nm, preferably 1500 nm-3000 nm and particularly preferably 2000 nm-2800 nm. The second wavelength range is therefore located in a longer wavelength spectral range than the first wavelength range. The second measuring unit preferably comprises a PbS-based measuring element, e.g., a PbS-based semiconductor, which can be part of a photodiode. It can additionally be provided that the second measuring unit comprises a plurality of PbS-based measuring elements. The second measuring unit is particularly suitable for measuring fire-like phenomena in a temperature range of 300° C.-500° C. The second measuring unit has a high sensitivity in the said wavelength range but the detected signals also comprise a relatively high noise component. The signals obtained can only be amplified slightly. The signal-to-noise ratios that can be achieved in the said wavelength range are therefore rather low. If, for example, there are fire-like phenomena that emit electromagnetic radiation in the second wavelength range, or radiation absorption phenomena (for example, by organic particles), then the second measuring unit—due to the absorbed radiation—becomes "blind" to a certain extent in the second wavelength range, i.e., a metrological detection of the fire-like phenomenon by the second measuring unit is prevented. In such a case, however, fire-like phenomena of this type can be detected by the first measuring unit—with a suitable adjustment of the measurement sensitivity. Accordingly, the knowledge of the occurrence of such absorption phenomena is of particular importance for a corresponding adjustment of the measurement sensitivity. The knowledge or probability of the existence of such radiation absorption can constitute the adjustment criterion (to be fulfilled) that requires a measurement sensitivity adjustment (in particular in the first measuring unit). The existence of such radiation absorption can be determined on the basis of measurement data recorded with the measurement arrangement (e.g. from the intensity data of the measurement data recorded by the first and second measuring unit). The existence of such radiation absorption can also be concluded from medium- or environment-specific measurement data recorded with the sensor unit. As it were, from an evaluation of all recorded measurement data covering measuring or sensor units. On the basis of stored medium- or environment-specific measurement data, it can also be checked whether the occurrence of such radiation absorption is to be expected. In order to check the existence of the radiation absorption described, a combined evaluation of measurement data recorded by measurement and stored characteristic data can also be carried out.

As mentioned, the optionally provided third measuring unit is adapted to detect electromagnetic radiation from ambient light in a wavelength range of 100 nm-500 nm. In particular, the third measuring unit can be adapted to detect UV light (UV-A, UV-B, UV-C), i.e. to detect electromagnetic radiation in a wavelength range of 100 nm-380 nm. The third measuring unit can correspond to the first measuring unit but without a filter restricting the detectable wavelength range. Correspondingly, the first measuring unit can have a filter. A filter which opens at a wavelength of 1500 nm can also be arranged on the second measuring unit. Ambient light can enter the reservoir through openings in the reservoir as such or through openings in an associated duct or pipe system. Light can also emanate from machine or system components. Ambient light can disrupt the reliable detection of fire-like phenomena with the first and/or second measuring unit but in particular the detection performance of the first measuring unit since the wavelength range of the ambient light is in the range of the spectral range that can be detected by the first measuring unit. Accordingly, the presence of ambient light can be an adjustment criterion, as a result of which a measurement sensitivity adjustment is carried out in the first measuring unit (e.g., to ensure better detection of the electromagnetic radiation emitted by a fire-like phenomenon). It can also be provided to switch off the first measuring unit when ambient light is present in order to avoid a measurement impairment in this respect. However, ambient light can also be determined on the basis of measurement data recorded with the first and/or second measuring unit, for example on the basis of the signal curve over time or the peak shape. This is because whereas fire-like phenomena (e.g., sparks) always have a changing peak shape in the time domain, the peak shape of stationary ambient light is unchanging or constant. Accordingly, the presence of ambient light can be concluded from the temporal signal profile of the measurement data recorded with the first and/or second measuring unit.

As already mentioned, the sensor unit optionally provided in the measurement arrangement is adapted to record media-specific or environment-specific measurement data, for example, a pressure, a density, a temperature, a humidity value, a particle concentration or a gas concentration of the medium or the environment of the media. The measurement data that can be recorded with the sensor unit can also be taken into account in the risk assessment of a fire-like phenomenon recorded with the measuring units. The said measurement data can also be taken into account when checking for the existence of an adjustment criterion. It should be emphasized that the sensor unit can also be arranged outside a housing containing the first, second and third measuring unit. For example, the sensor unit can be installed in a stationary manner in the reservoir, on the reservoir or outside the reservoir. The sensor unit can also be arranged in or on a plant or machine part which is connected to the reservoir.

As mentioned, a apparatus according to the invention is characterized by a checking means that is set up to check at a current time point on the basis of measurement data recorded with the measurement arrangement and/or stored medium- or environment-specific characteristic data, whether an adjustment criterion is met, wherein if the adjustment criterion is met, a measurement sensitivity or an operating parameter of at least one of the measuring units can be adapted adequately to the situation using a control means. The mentioned checking and, optionally adjustment can be carried out at current time points in a pre-determined time interval, at specified time points (also aperiodically) or continuously (i.e., permanently). Such a check can also be carried out after a system change (e.g., an exchange of the medium).

The checking means can be a computing unit and/or a routine stored on a computing unit, software or an algorithm. A "checking means" can also be understood as a computing unit combined with a routine, software or an algorithm. A checking means can include one or more computing units and/or one or more routines, software programs or algorithms. The checking means can further be configured in the form of a microcontroller, as it were a logic circuit, for example, an FPGA or an ASIC. The adjustment criterion can be predefined by the user. It is also possible to determine the adjustment criterion using the checking means or an associated computing unit, a routine, software or an algorithm. The adjustment criterion can be subjected to a checking or adjustment (e.g. updating) at predetermined time intervals, at predetermined times or continuously. The mentioned stored medium- or environment-specific characteristic data can be stored in a database that is part of the checking means (the computing unit). Alternatively, the medium- or environment-specific characteristic data can be stored in an external database, wherein the checking means is connected to the external database by signal technology and thus can access the data stored there.

On the one hand, therefore by using the checking means it can be checked whether there is a need to adjust a measurement sensitivity or an operating parameter. On the other hand, by using the checking means, an assessment can be made as to whether the recorded fire-like phenomenon is an event that poses an increased risk of fire or explosion or not. In the latter case, this can be passed on to an alarm system.

As described, if the adaptation criterion is met (this is checked by the checking means), a measurement sensitivity or an operating parameter of at least one of the measuring units can be adapted adequately to the situation using a control means. For this purpose, the control means is connected to the checking means by signal technology, for example via a wireless or wired signal connection. Equally, control means and checking means can be implemented in a common computing unit or can be executed on a common computing circuit board. The control means can also be a routine, software or an algorithm. Furthermore, the control means can be configured in the form of a microcontroller, as it were, a logic circuit, for example an FPGA or an ASIC.

A measurement sensitivity or an operating parameter of at least one of the measuring units can be adapted adequately to the situation at a current time point provided that the adjustment criterion A is met. For this purpose, a measurement sensitivity and/or an operating parameter in the first measuring unit, a measurement sensitivity and/or an operating parameter in the second measuring unit, and/or a measurement sensitivity and/or an operating parameter in the third measuring unit can be adjusted via the control means. The first or second measurement sensitivity can be set via amplification modules (assigned to the first and second measuring unit), which are connected to the control means by signal technology. At the same time, the amplification modules can be connected to the measuring units by signal technology. The amplification modules can be configured, for example, in the form of signal amplifiers or pre-amplifiers, wherein these can be either of an analog or digital nature. Furthermore, the adjustment of the measurement sensitivity can relate to an adjustment of a threshold value stored with respect to the first and/or second measuring unit for triggering a danger signal. The threshold values can be stored in the measuring units as such, in the checking means, in the database or in the control means. The operating parameters relate in particular to an operating status of the measuring units, in particular an online status (acquisition of measurement data possible), a standby status (power supply on standby, activation required for acquisition of measurement data) or an offline status (no power supply or switched off status, no acquisition of measurement data possible).

Advantageous embodiments of an apparatus according to the invention will be explained in detail at a later point. Firstly, however, reference is made to the system also proposed with the invention.

In addition to the apparatus already described, the invention also relates to a system for eliminating a hazardous state produced by a fire-like phenomenon, in particular a spark, flame, embers or hot particle phenomenon in a reservoir through which media flows or which is loaded with media. The system comprises (has) an apparatus configured according to the invention and a device for eliminating the hazardous state.

The device for eliminating the hazardous state can be a device for actuating a mechanical or electronic component of a machine device comprising the reservoir through which media flows or which is loaded with media, wherein the device for eliminating the hazardous state can in particular be a shut-off device or adjusting device of the machine device. The machine device can comprise an individual machine in which the reservoir through which media flows or which is loaded with media is arranged. The machine device can, for example, be a manufacturing, production or processing machine. Furthermore, the machine device can comprise a plant or machine arrangement composed of several machines, for example, a complete production or processing shop or alternatively a production or processing line. In this case, the reservoir through which media flows or which is loaded with media can be arranged in one of the machines pertaining to the plant or extend over several machines pertaining to the plant. If the device for eliminating the hazardous state comprises a shut-off device of the machine device, the machine device overall or parts of the machine device (e.g. individual machines of a plant or machine arrangement or certain parts of a machine) can be shut down when a hazardous state exists. The shut-down of the machine device or of machine parts can prevent the formation of a fire, conflagration or explosion, for example, whereby fire-, conflagration- or explosion-promoting particle movements come to a standstill as a result of the shutdown. Instead of a complete shutdown, the machine or parts of the machine can also be transferred into a standby mode. It can be particularly advantageous as a result of ascertaining the hazardous state to selectively shut down or transfer into a standby state only those machine parts from which the hazardous state emanates and/or whose shutdown or transfer into the standby mode eliminates the hazardous state. Other parts of the machine device can then remain in the operating mode (no shutdown or switchover to the standby mode necessary). An "adjusting device" can be understood, for example, as a valve, a switch, a slide or the like through which, for example, a particle flow can be interrupted or diverted. In this case, it can be avoided that further particles are fed to a hazard point (e.g. a seat of a fire, a flame source, a pocket of embers, glowing embers etc.). It is also conceivable to prevent the supply of fire-promoting materials, for example, oxygen. It is additionally conceivable to ensure the supply of a fire-retardant material, in particular a fire-retardant gas in the direction of a seat of a fire, a flame source, a pocket of embers, glowing embers via the adjusting device. The device for actuating a mechanical or electronic component can be automated, for example, as a result of the receipt of corresponding danger signal by the apparatus according to the invention, as it were but also semi-automated or manual.

As described, an assessment can be made by means of the checking means as to whether a detected fire-like phenomenon comprises an event (hazardous state) from which an increased risk of fire or explosion arises or not. If this comprises such an event of increased risk of fire or explosion or already comprises an evolution of fire, flames or embers classified as hazardous (also a hazardous state), an actuation command can be output to the device for eliminating the hazardous state so that a corresponding actuation of the device for actuating a mechanical or electronic component of a machine device comprising the reservoir through which media flows or which is loaded with media can be triggered. The need to relay an actuation command can be relayed to the system from the checking means or the sensor arrangement via a signal connection. The system can therefore be connected to the apparatus according to the invention by signal technology and have a receiving means (e.g. a reception interface or a receiver for data transmitted wirelessly/in a wired manner) to receive a danger signal triggered by the apparatus.

It can further be provided that the device for eliminating the hazardous state is an extinguishing device. This can be provided additionally or alternatively to the device for actuating a mechanical or electronic component of the machine device.

The extinguishing device can be a spark, flame, embers or hot particle extinguishing device connected to the apparatus (according to the invention) by signal technology and comprise receiving means for receiving a danger signal triggered by the apparatus. By using the extinguishing device, sparks, flames embers or hot particles in the reservoir through which media flows or which is loaded with media can be extinguished upon receipt of the danger signal by using an extinguishing agent. Upon receipt of the said danger signal, the extinguishing device for eliminating (i.e. for extinguishing) the hazardous state can be activated. It should be stressed that the risk assessment can be made directly in the system (i.e. not by the checking means pertaining to the apparatus). An extinguishing agent can be introduced into the reservoir by the extinguishing device to extinguish the fire-like phenomenon. The extinguishing agent can, for example, comprise a spray mist (of water or extinguishing foam).

Since the system according to the invention uses an apparatus according to the invention, i.e. an intelligent spark detector, by means of which unnecessary false alarms can be avoided, the device for eliminating a hazardous state is also only activated in actual hazardous situations or cases of need. An unnecessary shutdown of the machine device or an unnecessary extinguishing process, and possibly ensuing damage to the machine and plant parts, is thus avoided. In addition, unnecessary production or operating downtimes are avoided by such an "intelligent" system, with the result that costs can in turn be saved.

Furthermore, the system can comprise an alarm system for issuing a visual and/or audible alarm when the hazardous state occurs. It can therefore be provided alternatively or additionally to the actuation of the device for eliminating the hazardous state that an alarm is issued when the hazardous state occurs. The alarm can have the result that persons located in the vicinity of the machine device are warned of a possible danger. Furthermore, as a result of the alarm, measures are taken to eliminate the hazardous state, for example, by automated, semi-automated or manual actuation. The alarm system can comprise corresponding (visual, audible) alarm means for issuing visual and/or audible alarms. Visual alarm means can, for example, be signal lights, audible alarm means can, for example, be sirens or loudspeakers via which an audible alarm signal can be output. The provision of alarm means is advantageous to warn persons located in the surroundings of any danger or to guide support staff or rescue teams or fire-fighting teams to the site of the hazard or the event. Operating staff of the machine device can also be made aware of the existence of a hazardous state by means of the alarm means so that, for example, it is possible to (manually) actuate the device for eliminating the hazardous state.

The alarm system can be connected to the apparatus (according to the invention) by signal technology. Furthermore, the alarm system can have receiving means for receiving a danger signal triggered by the device. The transmission of information relating to a present danger signal can be transmitted to the alarm system by another device of the system.

Furthermore, the present invention relates to a method for metrological detection of fire-like phenomena, in particular a spark, flame, embers or hot particle phenomenon in a reservoir through which media flows or which is loaded with media, using an apparatus configured according to the invention, wherein     a. using the first measuring unit, electromagnetic radiation emitted by the fire-like phenomenon in a first wavelength range together with relevant measurement data is recorded;

b. using the second measuring unit, electromagnetic radiation emitted by the fire-like phenomenon in a second wavelength range together with relevant measurement data is recorded;
c. optionally using the third measuring unit ambient light together with relevant measurement data is recorded;
d. optionally using a sensor unit media-specific or environment-specific measurement data are recorded, wherein at a current time point using a checking means it is checked on the basis of the recorded measurement data and/or stored medium- or environment-specific characteristic data whether an adjustment criterion is satisfied and if the adjustment criterion is satisfied, a measurement sensitivity or an operating parameter of one of the measuring units is adapted adequately for the situation. The features described hereinbefore in connection with an apparatus according to the invention can readily be understood as advantageous embodiment features of a method according to the invention.

The method can be executed continuously, in a predefined time interval or at time points to be predefined manually. Accordingly, a periodic execution of the method, an aperiodic execution of the method or a needs-based execution of the method is possible.

Further advantageous embodiments of an apparatus according to the invention are obtained from the features specified in the dependent claims and described hereinafter. Reference should also be made hereinafter to the features specified in the dependent claims. The features described herein after can also be advantageous embodiments of a method according to the invention.

According to a first embodiment of an apparatus proposed according to the invention, it can be provided that a respective measurement sensitivity optimum of the first and second measuring unit lies in different wavelength ranges. Due to a measurement sensitivity optimum of the first and second measuring unit that lies in different spectral ranges, fire-like phenomena can be detected which emit electromagnetic radiation in different wavelength ranges. Since fire-like phenomena having different temperatures or of a different nature (e.g. a spark or a flame) emit electromagnetic radiation in different wavelength ranges, this can therefore be reliably detected. Furthermore, it is thus possible to detect fire-like phenomena (or the relevant electromagnetic radiation) in their respective wavelength ranges with optimized sensitivity.

As mentioned, the first measuring unit can be adapted for detecting electromagnetic radiation in a wavelength range of 100 nm-1500 nm, and preferably of 750 nm-1200 nm, wherein the measurement sensitivity optimum of the first measuring unit lies in a wavelength range of about 950 nm, preferably precisely at 950 nm. Furthermore, it has already been described that the second measuring unit can be adapted for recording electromagnetic radiation in a wavelength range of 1000 nm-3500 nm, preferably of 1500 nm-3000 nm and particularly preferably of 2000 nm-2800 nm.

As mentioned, the first measuring unit has a relatively low measurement sensitivity in a wavelength range of >1000 nm. The first measuring unit is certainly only weakly sensitive for electromagnetic radiation >1000 nm but if the measurement signal is sufficiently amplified, those signals recorded in this wavelength range using the first measuring unit with low signal weakness can be amplified to the extent that qualitative and/or quantitative information on fire-like phenomena—emitting electromagnetic radiation in this wavelength range—can be deduced from the amplified measurement data. As mentioned, the second measuring unit is particularly suitable for metrological detection of fire-like phenomena in a temperature range of 300° C.-500° C. In the said wavelength range the second measuring unit has a high sensitivity but the recorded signals also have a relatively high noise component. The signals obtained can only be amplified slightly. If, for example radiation absorption phenomena (for example, by organic particles) occur in the case of fire-like phenomena that emit electromagnetic radiation in particular in the second wavelength range, then the second measuring unit—due to the absorbed radiation—becomes "blind" to a certain extent in the second wavelength range, i.e., a metrological detection of the fire-like phenomenon by the second measuring unit is prevented. In such a case, however, fire-like phenomena of this type can be detected by the first measuring unit—with a suitable adjustment of the measurement sensitivity (amplification or adjustment of the threshold value). Accordingly, it can be deduced from the said example that as a result of a media-dependent circumstance (or an event such as radiation absorption), a measurement sensitivity adjustment of the first and second measuring unit adapted to the specific requirements can be made. Correspondingly even in the event of a functional failure, a reduced performance or for measurement technology reasons, an adjustment of the measurement sensitivity to the specific requirement can be made.

According to a further embodiment of an apparatus proposed with the invention, it can be provided that third measuring unit is adapted to detect electromagnetic radiation from ambient light in a wavelength range of 100 nm-500 nm. In particular, the third measuring unit can be adapted to detect UV light (UV-A, UV-B, UV-C), i.e. to detect electromagnetic radiation in a wavelength range of 100 nm-380 nm. The reliable detection of ambient light is a crucial factor for avoiding false alarms. Since certain fire-like phenomena emit electromagnetic radiation in the wavelength range of the ambient light and the first measuring unit ha a relatively high measurement sensitivity in this range, a false alarm can be triggered in specific cases of detected ambient light. In order to avoid this, the detection of ambient light by means of an ambient light sensor (third measuring unit) optimized for this detection is of enormous relevance for avoiding false alarms. The measurement data recorded by the third measuring unit can thus be checked for the presence of ambient light. If affirmed, either the adjustment criterion can already be satisfied (the qualitative presence of ambient light can be an adjustment criterion) or this positive determination alone or in combination with further measurement and/or characteristic data is checked for the presence of a differently defined adjustment criterion. If the presence of ambient light is qualitatively demonstrated, it can be arranged, for example, that the first measuring unit that is also selective in the range of ambient light, is brought into a standby mode or into a switched-off state (an operating parameter relating to the operating state is therefore adjusted).

According to a further embodiment of an apparatus proposed with the invention, it can be provided that the sensor unit adapted for measuring media-specific or environment-specific measurement data is a pressure sensor unit, a density sensor unit, a temperature sensor unit, a humidity sensor unit, a sensor unit for measuring a particle concentration or an arrangement of a plurality of the aforesaid sensor units.

The parameters that can be determined using the sensor unit therefore relate to a pressure, a density, a temperature, a humidity value, a particle concentration or a gas concentration of the medium or the surroundings of the medium. The said parameters can influence the probability of the presence of a fire-like phenomena in the medium or the surroundings of the medium. An increased pressure can, for example, intensity the particle movement, a high temperature can contribute as such to the ignition of an ignition initiator, high particle concentrations can increase the risk of explosion (depending on the type of gas), a low humidity can also increase the risk of a fire or explosion. Accordingly, the detection of these conditions specifically present in the medium or the surroundings can be of high importance for assessing the hazard relevance of a detected fire-like phenomenon. If the recorded media-specific or environment-specific measurement data tend to indicate a low risk of triggering a fire or explosion for a detected fire-like phenomenon (e.g. in the case of a low particle concentration of particles of the medium), the detection of a fire-like phenomenon can be classified as harmless. In contrast to this, a fire-like phenomenon can be classified as dangerous with regard to initiating a fire or explosion if certain media-specific or environment-specific conditions are correspondingly present. As it were, if certain media-specific or environment-specific conditions (detectable via the third measuring unit) are present, an adjustment of the measurement sensitivity or an operating parameter of one of the measuring units can be necessary or appropriate.

According to a further embodiment of an apparatus proposed with the invention, it can be provided that the media-specific or environment-specific measurement data are measurement data measured by the sensor unit in the medium or in the surroundings of the medium. By including "measured" media-specific or environment-specific measurement data, conditions specifically and currently prevailing in the reservoir can be taken into account directly when checking for the fulfilment of an adjustment criterion. Thus, due to the conditions prevailing at a certain time point in the reservoir, an adjustment of the measurement sensitivity (e.g. as a result of a low particle concentration) or an operating parameter can already be necessary. Furthermore, an adjustment criterion can also be determined or specified on the basis of these data. Thus, conditions specifically prevailing in the reservoir can also be taken into account in the risk assessment of a detected fire-like phenomenon.

According to a further embodiment of an apparatus proposed with the invention, it can be provided that the media-specific or environment-specific characteristic data are characteristic data stored in a database and in particular relate to a pressure, a density, a temperature, a humidity value, a particle concentration or a gas concentration of the medium or of the surroundings of the medium. Depending on the type of medium present in the reservoir or associated framework conditions, it can be simulated, for example, whether there is a sufficient probability for the necessity of the adjustment of an operating parameter or a measurement sensitivity of one of the measuring units. Accordingly, a specific probability value (e.g. for the existence of radiation absorption by organic particles) or a condition to be achieved by simulation can be defined as adjustment criterion and when this is satisfied, an adjustment of a measurement sensitivity or an operating parameter of one of the measuring units is performed.

The media-specific or environment-specific characteristic data can relate to specific control parameters of a machine device having a reservoir which is loaded with media or through which media flows (e.g. a plant). If a change relating to a media-specific or environment-specific characteristic datum or a control parameter as media-specific or environment-specific characteristic data occurs (e.g. in a machine device), resulting from, for example, a change of medium, a changed operating parameter in the machine device or the like, this can be taken into account by way of a manual or automated adjustment of the measurement sensitivity or operating parameters of one of the measuring or sensor unit(s) pertaining to the measurement arrangement, and provide an intelligent learning process. As a result of a change relating to a media-specific or environment-specific characteristic datum or a control parameter as media-specific or environment-specific characteristic datum (e.g. by adjustment of control parameters of the machine device), a message can be output, for example, that initiates an automated or manual re-calibration or a learning process of the measurement arrangement. The apparatus according to the invention can therefore interact "intelligently" with other measuring units, intelligences, machines etc. To this end the apparatus can have corresponding communications and data processing means.

According to a further embodiment of an apparatus proposed with the invention, it can be provided that the adjustment criterion is a predefined absolute value or a predefined value range, wherein the absolute value or the value range is related to a pressure, a density, a temperature, an air humidity, a particle concentration or a gas concentration or that a plurality of the aforesaid parameters form a combined adjustment criterion. The "specification" of a value can be understood as a specification by the user or a computational or algorithmic value determination. In many cases, it is not possible to derive a need for a measurement sensitivity adjustment or an operating parameter adjustment on the basis of pure absolute values (e.g. as a result of fluctuations naturally present in a dynamic system). Recourse to value ranges (e.g. in the sense of tolerance ranges) is therefore frequently the means of choice to compensate for the fluctuations of the system (e.g. varying temperatures, pressures, particle concentrations or the like).

According to a further embodiment of an apparatus proposed with the invention, it can be provided that the checking means is adapted to compare a media-specific or environment-specific measurement datum measured using the sensor unit or a stored media-specific or environment-specific characteristic datum with the adjustment criterion and to check whether the measurement datum or the characteristic datum agrees with the predefined absolute value or lies within the predefined value range, wherein in the case of a positive determination in this respect, the adjustment criterion is satisfied and the control means is adapted to
   a. to adjust an operating parameter of at least one of the measuring units, wherein the operating parameter in particular is an operating status in the sense of an online, offline or stand-by status and/or
   b. to adjust, in particular to weaken or to increase the measurement sensitivity of the first and/or second measuring unit, and/or
   c. to adjust, in particular to reduce or to increase, a threshold value for triggering a danger signal stored in relation to the first and/or second measuring unit.

In the case of a positive determination, a command signal can be transmitted to the control means by the checking means whereupon one or more of the aforesaid adjustments can be made.

If it is established, for example, that one or more media-specific or environment-specific measurement data or one or more stored media-specific or environment-specific characteristic data agree with one or more predefined absolute value(s) or lie within one or more predefined value ranges, it can be determined whether an adjustment of an operating parameter can reduce the probability of false alarms or increase the measurement precision. In specific cases, a detection of a fire-like phenomenon can only be made possible at all by an adjustment of an operating parameter or an adjustment of a measurement sensitivity. Additionally or alternatively it can be determined whether an adjustment of the measurement sensitivity of the first and/or second measuring unit is required to avoid false alarms, for example, or to improve the performance and/or measurement precision. Furthermore, it can be determined additionally or alternatively whether a measured value for triggering a danger signal stored in relation to the first and/or second measuring unit is adjusted, in particular is reduced or increased. A lower threshold value results in more rapid triggering of a danger signal since the trigger threshold is reached more rapidly. A higher threshold value results in a later triggering of a danger signal since the threshold to be reached assumes a higher value. The threshold value adjustment can also take place instead of the measurement sensitivity adjustment. In addition to avoiding false alarms, the said embodiment can ensure that in the case where specific operating and/or performance parameters of the measurement arrangement are not suitably/optimally adjusted in relation to a machine or plant containing the reservoir, a reliable detection of fire-like phenomena is nevertheless ensured, for example, due to the said adjustment of operating parameters, threshold values or measurement sensitivities. Such an adjustment can be designated as an intelligent self-learning process.

According to a further embodiment of an apparatus proposed with the invention, it can be provided that the checking means is adapted to check measurement data recorded by the third measuring unit for the presence of ambient light, a predefined ambient light intensity or a predefined measurement data specific characteristic value as adjustment criterion, wherein in the case of a positive determination in this respect, the adjustment criterion is satisfied and the control means is adapted to
 a. switch off the first measuring unit,
 b. to weaken the measurement sensitivity of the first measuring unit or
 c. to adapt, in particular to increase a threshold value for triggering a danger signal stored in relation to the first measuring unit.

In the case of a positive determination, a command signal can be transmitted to the control means by the checking means, whereupon one of the aforesaid adjustments can be performed.

When ambient light is present, a shutdown of the first measuring unit (alternatively also a switchover to an offline or standby status) can be advantageous since the first measuring unit is measurement-sensitive in the wavelength range of the ambient light. In order to then avoid a false alarm triggered by the ambient light, the first measuring unit can be switched off at least temporarily. A disadvantage here however is that then fire-like phenomena can no longer be detected by the first measuring unit. Accordingly, the measurement sensitivity of the first measuring unit can be reduced (weakened) so that the ambient light does not exceed a predefined threshold value for triggering a danger signal. Finally it can be provided to increase a threshold value for triggering a danger signal stored in relation to the first measuring unit. The threshold value can, for example, relate to the signal intensity of the recorded electromagnetic radiation at a specific wavelength or in a specific wavelength range. It can thus be ensured that despite the presence of ambient light, signal-intensive fire-like phenomena can be detected with the first measuring unit but a danger signal is only triggered as soon as a specific signal intensity value (this can provide the threshold value) is exceeded. The ambient light of lower intensity is therefore not taken into account.

Furthermore, the time behaviour of the measurement signal recorded by the first and/or second measuring unit can be checked for the presence of a measurement-data-specific characteristic value. In relation to their signal shape, fire-like phenomena usually exhibit individually distinguishable signal peaks whereas the temporally recorded signals cannot be distinguished in this respect from stationary (i.e. constant) ambient light. This can also be an indicator for the presence of ambient light. The third measuring unit (the ambient light sensor) can also make use of this principle.

According to a further embodiment of an apparatus proposed with the invention, it can be provided that the checking means is adapted to check measurement data recorded by the first and/or second measuring unit for the fulfilment of a measurement-data-specific criterion as adjustment criterion, wherein in the case of a positive determination in this respect, the adjustment criterion is satisfied and the control means is adapted
 a. to adjust an operating parameter of at least one of the measuring units, wherein the operating parameter in particular is an operating status in the sense of an online, offline or stand-by status and/or
 b. to adjust, in particular to weaken or to increase the measurement sensitivity of the first and/or second measuring unit, and/or
 c. to adjust, in particular to reduce or to increase, a threshold value for triggering a danger signal stored in relation to the first and/or second measuring unit.

In the case of a positive determination, a command signal can be transmitted to the control means by the checking means, whereupon one or more of the aforesaid adjustments can be made.

Media-specific criterion can be understood, for example, as a signal intensity present at a specific wavelength, a signal intensity integrated or averaged over a predefined wavelength range, a signal intensity weighted with a weighting factor, a curve feature of a wavelength-dependent signal intensity curve (abscissa: wavelength; ordinate: signal intensity) or further parameters that can be extracted or calculated from the measurement data.

An adjustment of an operating parameter can reduce the probability of false alarms or increase the measurement precision. In certain cases, a detection of a fire-like phenomenon can only be made possible at all by an adjustment of an operating parameter or the adjustment of the measurement sensitivity. Assuming that in principle the electromagnetic radiation emitted by a fire-like phenomenon can indeed be detected by the second measuring unit, the emitted radiation is however previously absorbed, e.g. by organic particles in the reservoir. In such a case, a wavelength-specific detection by means of the second measuring unit leads to incorrect results (or none at all). By increasing the measurement sensitivity of the first measuring unit, the only low sensitivity of the first measuring unit in the second wavelength range can be increased by increasing the measurement sensitivity. It is thus possible that the first measuring unit can detect fire-like phenomena outside its wavelength-related sensitivity optimum. In such a case, the first measuring unit takes over the position of the second measuring unit or compensates for its reduced performance. Such a procedure is comparable with an off-resonance measurement at high signal amplification. Additionally or alternatively it can be checked whether a measurement sensitivity adjustment of the first and/or second measuring unit is required, for example, to avoid false alarms or to improve the performance and/or measurement precision. Furthermore, it can additionally or alternatively be determined whether a threshold value for triggering a danger signal stored in relation to the first and/or second measuring unit should be adjusted, in particular reduced or increased. As mentioned, the lower threshold value results in a more rapid triggering of a danger signal since the trigger threshold is reached more rapidly. A higher threshold value results in a later (delayed) triggering of a danger signal. The adjustment of the threshold value can also take place instead of adjustment of the measurement sensitivity.

Furthermore, the qualitative (or quantitative in relation to a signal intensity) presence of ambient light can be determined on the basis of measurement data recorded using the first and/or second measuring unit, for example, using the temporal signal behaviour or the peak shape. This is because whereas fire-like phenomena (e.g. sparks) always exhibit a peak shape which varies in the time domain, the peak shape of stationary ambient light is unchanged or constant. Accordingly, the presence of ambient light can be concluded from the temporal signal behaviour of the measurement data recorded using the first and/or second measuring unit. Accordingly, a qualitative determination (but also a quantitative intensity determination) of ambient light can constitute an adjustment criterion.

According to a further embodiment of an apparatus proposed with the invention, it can be provided that the checking means is adapted to check measurement data recorded by the first and/or second measuring unit for the presence of radiation absorption of the electromagnetic radiation emitted by the fire-like phenomenon by the medium as adjustment criterion, wherein in the case of a positive determination in this respect, the adjustment criterion is satisfied and the control means is adapted to
 a. switch off the second measuring unit,
 b. to weaken the measurement sensitivity of the second measuring unit and/or
 c. to increase the measurement sensitivity of the first measuring unit and/or
 d. to adjust, in particular to decrease a threshold value for triggering a danger signal stored in relation to the first measuring unit.

Knowledge of the occurrence of absorption phenomena in which electromagnetic radiation of a fire-like phenomenon is absorbed at a specific wavelength or in a specific wavelength range can make it possible to safely detect hazardous ignition initiators (despite radiation absorption) using an apparatus according to the invention (or a method according to the invention). The knowledge or probability of the presence of such radiation absorption can constitute the adjustment criterion (to be satisfied) necessitating a measurement sensitivity adjustment (in particular in the first measuring unit). The presence of such radiation absorption can be concluded on the basis of measurement data recorded using the measurement arrangement (e.g. from the intensity data of the measurement data recorded using the first and second measuring unit). In particular, by increasing the measurement sensitivity of the first measuring unit, the electromagnetic radiation of a fire-like phenomenon absorbed in the spectral range of the second measuring unit can be recorded, for example, by a wavelength-shifted detection by means of the first measuring unit (off-resonant). Furthermore, it is possible that the fire-like phenomenon emits substantially electromagnetic radiation in the longer-wavelength range (this radiation component can be absorbed according to the present example, e.g. by organic particles) but nevertheless has radiation components in the shorter-wavelength spectral range which can then be reliably detected by the first measuring unit. The same can also be achieved by a reduction of the threshold value in the first measuring unit for triggering a danger signal which is additionally or alternatively provided. In the case of such radiation absorption, a switch-off of the second measuring unit or at least a weakening (damping) of the measurement sensitivity of the second measuring unit can also be carried out.

According to a further embodiment of an apparatus proposed with the invention, a calculation means that is part of the checking means or is connected to this by signal technology can be provided, wherein the calculation means is adapted to calculate, on the basis of stored medium- or environment-specific characteristic data, a probability value for the presence of a radiation absorption of electromagnetic radiation emitted by the fire-like phenomenon by the medium, wherein the adjustment criterion is a predefined probability value or a probability value range. As has already been described hereinbefore, for a specific medium in a reservoir (of known configuration and dimensions) knowing corresponding boundary conditions, the probability of the occurrence of radiation absorption in the longer-wavelength second wavelength range can be determined simulatively (by the calculation means). The data or knowledge determined by such a simulation can then be checked (optionally combined with further measured measurement data or stored environment- or media-specific characteristic data) for the need to adjust an operating parameter or a measurement sensitivity.

Accordingly the checking means can be adapted to check whether the calculated probability value agrees with the predefined probability value or lies in the predefined probability value range, wherein in the case of a positive determination in this respect, the adjustment criterion is satisfied and the control means is adapted to
 a. switch off the second measuring unit,
 b. to weaken the measurement sensitivity of the second measuring unit and/or
 c. to increase the measurement sensitivity of the first measuring unit and/or
 d. to adjust, in particular to decrease a threshold value for triggering a danger signal stored in relation to the first measuring unit.

In the case of a positive determination a command signal can be transmitted to the control means by the checking means, whereupon one or more of the aforesaid adjustments can be made. The threshold value adjustment can be made instead of the measurement sensitivity adjustment.

According to a further embodiment of an apparatus proposed with the invention, it can be provided that the first and the second measuring unit is assigned a common amplification module or that the first and second measuring unit are each assigned separate amplification modules, wherein the measurement sensitivity can be adjusted with the common or the separate amplification modules. In this the case, it can be provided that the common amplification module or the separate amplification modules are connected to the control means by signal technology. As it were, the amplification modules can be connected to the measuring units by signal technology. The amplification modules can be configured, for example, in the form of signal amplifiers or pre-amplifiers (preamplifier, preamp) wherein these can be both of an analog and of a digital nature. An amplification module is understood to mean that measurement signals are amplified in such a manner that these are present in a processable or desired signal amplification in a following stage.

According to a further embodiment of an apparatus proposed with the invention, it can be provided that the measurement arrangement and the control means are arranged in a common sensor housing. As a result of the arrangement in a common housing, it is possible to have a compact design of the apparatus and furthermore, the manufacturing expenditure is kept low. The installation and assembly expenditure of the apparatus on the reservoir to be monitored is thereby reduced. The housing can comprise a metal housing or a plastic housing.

According to a further embodiment of an apparatus proposed with the invention, it can be provided that the checking means is a computing unit or a routine executed on a computing unit, wherein the computing unit can be connected to an alarm device by signal technology. In addition to the execution of the checking means in the form of a routine, the checking means can be executed in the form of a program, a software, an application software (App), an algorithm etc. A checking means executed as a computing unit can be configured on a computing board and comprise electric circuits and electric functional components.

According to a further embodiment of an apparatus proposed with the invention, it can be provided that the computing unit is arranged in the sensor housing or is a computing unit arranged externally to the sensor housing. An arrangement of the computing unit in the sensor housing (e.g. in the form of a printed circuit board) can save installation space and provides the device directly with a logic intelligence. An external arrangement of the computing unit allows access to a larger computing capacity so that more complex evaluations, assessments, checks etc. can be carried out. In the case of an external arrangement of the computing unit, the computing unit can be a server or a computing centre. The computing unit can be formed from a plurality of interconnected computers or computers in signal communication. In an external arrangement of the computing unit, suitable transmitting and receiving means (communication means) are provided in the housing of the apparatus, as a result of which a signal and data exchange with the computing unit is possible. In this case, the transmitting and receiving means can be connected to a sub-computing unit arranged in the housing by signal technology.

An apparatus according to the invention can have a wired power supply. As it were, a self-sufficient power supply of the apparatus can be provided, e.g. in the form of a rechargeable battery or a battery. This can also be understood as an arrangement of rechargeable batteries or batteries. Accordingly the apparatus can have a power supply unit in the housing or on a part of the housing which comprises said rechargeable battery(ies) or battery(ies). In an advantageous embodiment the power supply unit can be charged in a contactless manner, e.g. by inductive charging. A solar module can also be linked to the power supply unit and provide the electrical energy required for operation.

According to a further embodiment of an apparatus proposed with the invention, it can be provided that the measurement arrangement is configured for arrangement outside the reservoir, wherein the first, second and/or third measuring unit pertaining to the measurement arrangement and/or the sensor unit are adapted to measure through an at least partially optically transparent device of the reservoir. The optically transparent can be part of the housing so that the housing of the apparatus can be inserted into an opening of the reservoir and thereby closes the opening. An optically transparent device can be provided in a wall of the reservoir in the region of which the housing is arranged. Fastening means which hold the apparatus mechanically on the wall of the reservoir can be provided on the housing of the apparatus for fastening to the reservoir.

Further features and advantages of the invention are obtained from the following description of exemplary embodiments of the invention which are not to be understood as restrictive, which are explained in detail hereinafter with reference to the drawings. In the drawings shown schematically.

Figure 1:
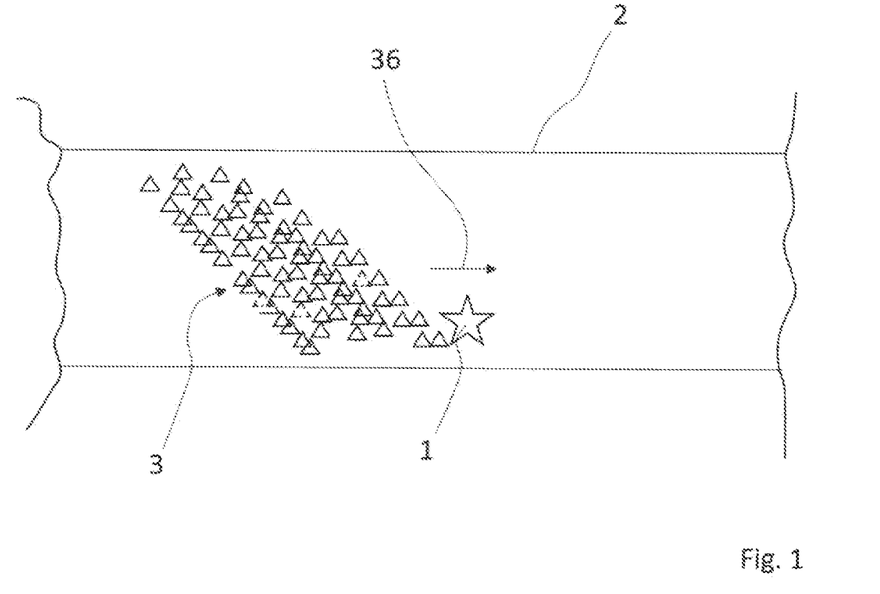
FIG. 1 shows a reservoir through which media flows with a fire-like phenomenon.

FIG. 1 shows a reservoir 2 through which media flows as part of a superordinate production or processing plant in a branch of industry listed in the introductory description. The reservoir 2 is configured as a duct (for example, tubular) along which a medium 3 is conveyed, namely along the conveying direction 36. The medium 3 comprises a solid which is present in particle form, as is illustrated by the plurality of depicted triangular shapes. The conveying is accomplished on the basis of gravity (e.g. by transport in the vertical direction as in a chute), alternatively conveyed mechanically or pneumatically. It is further noted that fire-like phenomena 1 can occur in the reservoir 2 through which media flows (illustrated schematically by a star shape). Fire-like phenomena 1 are understood in the present case in particular as sparks, flames, embers, pockets of embers etc. which under certain circumstances can act as initiators of a fire or even an explosion.

Figure 2:
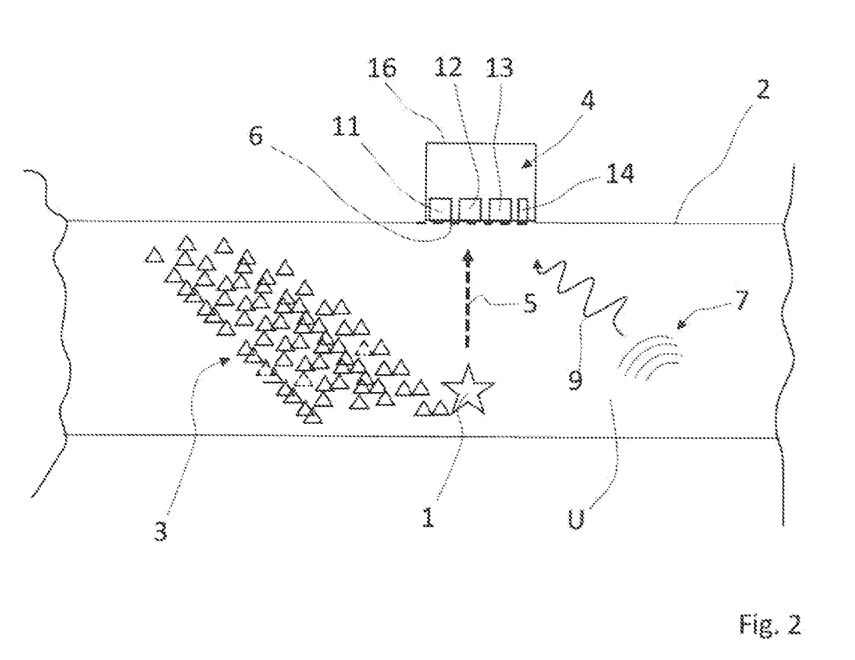
FIG. 2 shows an illustration of the basic functional principle of an apparatus according to the invention when used in a reservoir through which media flows according to FIG. 1.

In order to detect such fire-like phenomena 1 at an early stage and counteract the corresponding consequences, an apparatus according to the invention can be used which can also be designated as an intelligent spark detector. FIG. 2 illustrates the basic functional principle of an apparatus according to the invention. As can be seen there, the apparatus comprises a sensor housing 16 in which a measurement arrangement 4 is arranged. The measurement arrangement 4 is configured to record measurement data and comprises the first, second and third measuring units 11, 12, 13 as well as an optional sensor unit 14. The first measuring unit 11 is configured to detect electromagnetic radiation 5 emitted by the fire-like phenomenon 1 (illustrated by a dashed arrow) in a first wavelength range. The first wavelength range extends from 190 nm-1100 nm, and preferably from 430 nm-1100 nm, wherein the measurement sensitivity optimum of the first measuring unit 11 lies in a wavelength range of approximately 780 nm, preferably precisely at 780 nm. The second measuring unit 12 is configured for detecting electromagnetic radiation 5 emitted by the fire-like phenomenon 1 in a second wavelength range. The second wavelength range lies at 1000 nm-3100 nm and preferably extends from 1650 nm-3100 nm. The second wavelength range is therefore located in a longer-wavelength spectral range.

The third measuring unit 13 on the other hand is adapted for detecting electromagnetic radiation 9 from ambient light 7 in a wavelength range of 400 nm-500 nm. Ambient light 7 can enter into the reservoir 2 (or the duct) through openings in the reservoir or an associated duct system. Generation of light which provides for background light or ambient light 7 in the reservoir 2 can also originate from machine or plant components. Further, an (at least partially) optically transparent device 6, e.g. a pane through which radiation of specific wavelengths or specific wavelength ranges can pass can be provided in the region of the apparatus or sensor arrangement 4 placed on a wall of the reservoir 2. In this case, ambient light can optionally also penetrate from outside through the device 6 into the interior of the reservoir 2.

The sensor unit 14 optionally provided in the measurement arrangement 4 is adapted to record measurement data, for example, a pressure, a density, a temperature, a humidity value, a particle concentration or a gas concentration of the medium 3 or the surroundings U of the medium 3. This measurement data which can be recorded by the sensor unit 14 is optionally also taken into account in the risk assessment of a fire-like phenomenon 1 detected by the measuring units 11, 12. Optionally also the presence of ambient light 7 that can be detected by the third measuring unit 13 is more or less taken into account in the risk assessment.

Figure 3:
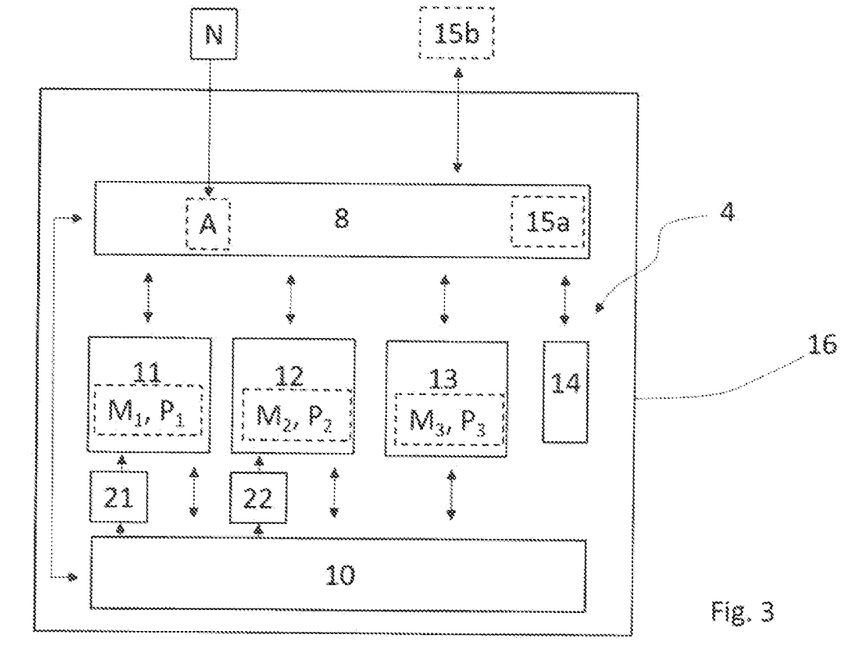
FIG. 3 shows a diagram of components pertaining to the apparatus according to the invention and the interaction thereof.

FIG. 3 shows a possible structure of the apparatus according to the invention in a detailed view compared with FIG. 2. It can be seen that the measuring units 11, 12, 13 and the optionally provided sensor unit 14 are arranged in a common housing 16. Furthermore, a checking means 8 is arranged in the housing, which is adapted to check at a current time point to on the basis of measurement data recorded by the measurement arrangement 4 and/or stored medium- or environment-specific characteristic data, whether a specific adjustment criterion A is satisfied. The checking means 8 is a computing unit and/or a routine stored on a computing unit, software or an algorithm. The adjustment criterion A can be specified externally by a user, e.g. by corresponding programming or corresponding input means. It is also possible that the adjustment criterion A is determined using the computing unit. The mentioned medium- or environment-specific characteristic data can be stored in a database 15a, which is part of the checking means 8 (the computing unit). Alternatively to this the medium- or environment-specific characteristic data are stored in an external database 15b, wherein the checking means 8 can access the database 15b via a signal connection (characterized by the double arrow). Thus, an exchange of data between checking means 8 and database 15b is possible. Furthermore, a control means 10 is provided 8 in the housing 16, which is also adapted to bring about a measurement sensitivity adjustment or operating parameter adjustment in the measurement arrangement 4 when the adjustment criterion A is satisfied. A command whereby a measurement sensitivity adjustment or operating parameter adjustment has to be made is transmitted to the control means 10 from the checking means 8, namely via a signal connection (see the depicted double arrow). The checking means 8 is therefore connected to the control means 10 by signal technology. Accordingly at a current time point to—provided that the adjustment criterion A is satisfied, a measurement sensitivity $M_1$, $M_2$, $M_3$ or an operating parameter $P_1$, $P_2$, $P_3$ of at least one of the measuring units 11, 12, 13 is adjusted adequately to the situation. For this purpose the control means 10 is connected to the measuring units 11, 12, 13 by signal technology (see the depicted double arrows which represent the said signal connections). Accordingly, if necessary, a measurement sensitivity $M_1$ and/or an operating parameter $P_1$ in the first measuring unit 11, a measurement sensitivity $M_2$ and/or an operating parameter $P_2$ in the second measuring unit 12, and/or a measurement sensitivity $M_3$ and/or an operating parameter $P_3$ in the third measuring unit 13 is adjusted via the control means 10. The setting of the first or second measurement sensitivity $M_1$, $M_2$ can be made via the amplification modules 21, 22 assigned to the first and second measuring unit 11, 12 which are connected to the control means 10 by signal technology. As it were, the amplification modules 21, 22 are connected to the measuring units 11, 12 by signal technology. The amplification modules 21, 22 can, for example, be configured in the form of signal amplifiers or pre-amplifiers, wherein these can be both of an analog or digital nature. Furthermore, the measurement sensitivity adjustment can relate to a threshold value for triggering a danger signal stored in relation to the first and/or second measuring unit 11, 12. The threshold values can be stored in the measuring units 11, 12 as such, the checking means 8, the database 15a, 15b or the control means 10. The operating parameters $P_1$, $P_2$, $P_3$ relate in particular to an operating status of the measuring units $M_1$, $M_2$, $M_3$, in particular an online status (recording of measurement data possible), a standby status (power supply in standby, activation required to record measurement data) or an offline status (no power supply or switched-off status, no recording of measurement data possible). FIG. 2 finally also reveals that the measuring units 11, 12, 13 as well as the sensor unit 14 are each in signal communication (cf. the double arrows) with the checking means 8. The recorded measured values can be relayed to the checking means 8 via these signal connections. The measured values can be subjected to a pre-processing which can take place in the measuring units 11, 12, 13 or the sensor unit 14.

Furthermore this can take place in the checking means 8. In the checking means 8 the measurement data are then evaluated and checked with regard to fulfilment of the adjustment criterion A. For this purpose the measurement data can be transferred into a desired data format or a desired data representation. Furthermore, a data selection, a data evaluation etc. can be made to check for fulfilment of the adjustment criterion A.

Figure 4:
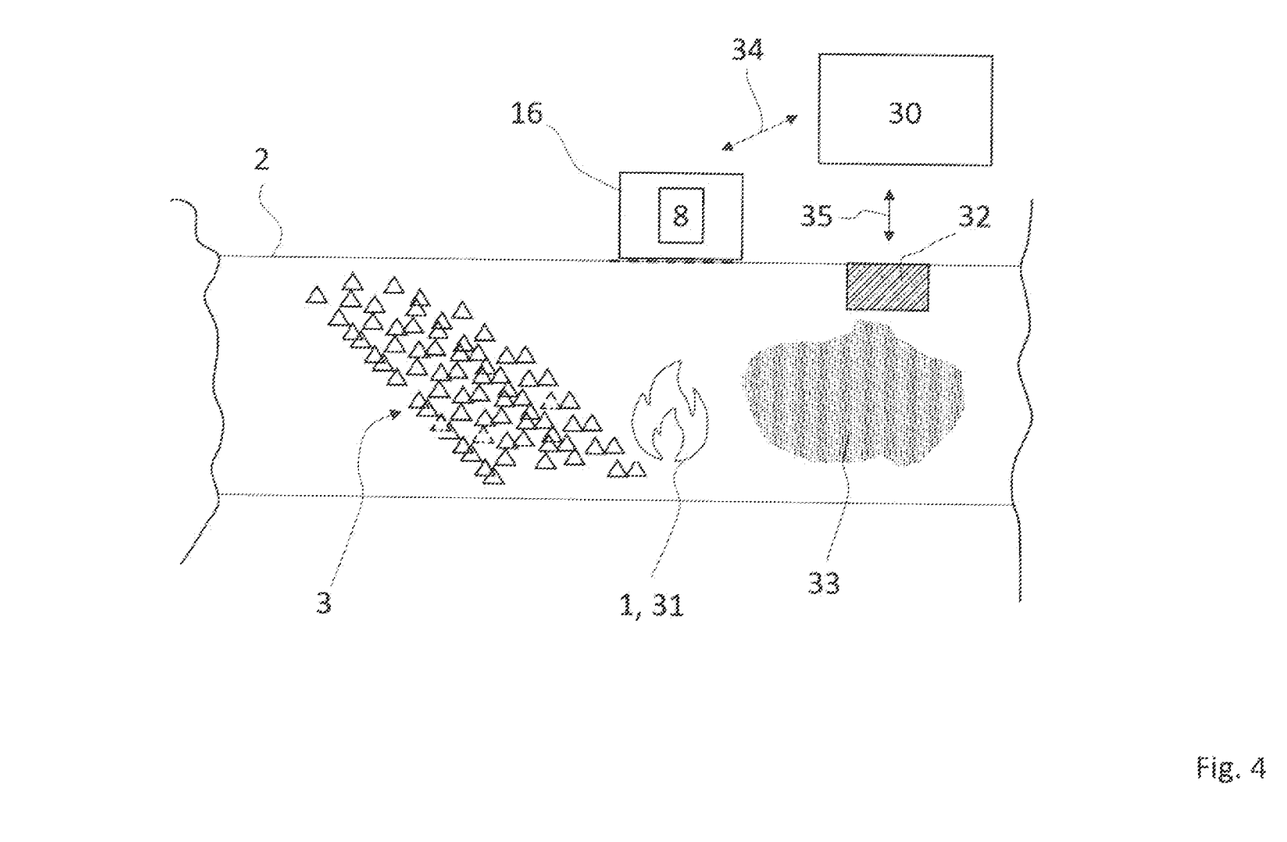
FIG. 4 shows an illustration of an extinguishing system according to the invention when used in a reservoir through which media flows according to FIG. 1.

FIG. 4 relates to a diagram of an extinguishing system according to the invention when used in the reservoir through which media flows according to FIG. 1. In the depicted example a flame 31 has originated from the fire-like phenomenon 1. As mentioned, electromagnetic radiation 5 emitted by the fire-like phenomenon 1 is detected by means of the measurement arrangement 4 arranged in the housing 16 (cf. 3). By means of the checking means 8, an assessment is made as to whether the detected fire-like phenomenon 1 is an event from which an increased risk of fire or explosion arises or not. If this is such an event with an increased risk of fire or explosion, or an evolution of fire, flame or embers already classified as hazardous, this is relayed from the checking means 8 or the sensor arrangement via a signal connection 34 to an alarm system 30 and optionally an extinguishing device 32 is activated for eliminating (i.e. extinguishing) the hazardous state which can be accomplished via a signal connection 35. However, the risk assessment can also be made directly in the alarm system 30. In order to extinguish the fire-like phenomenon 1 or flame 31, an extinguishing agent 33 can be introduced into the reservoir 2 by the extinguishing device 22. The extinguishing agent can comprise, for example, a spray mist (of water or extinguishing foam).

Figure 5:
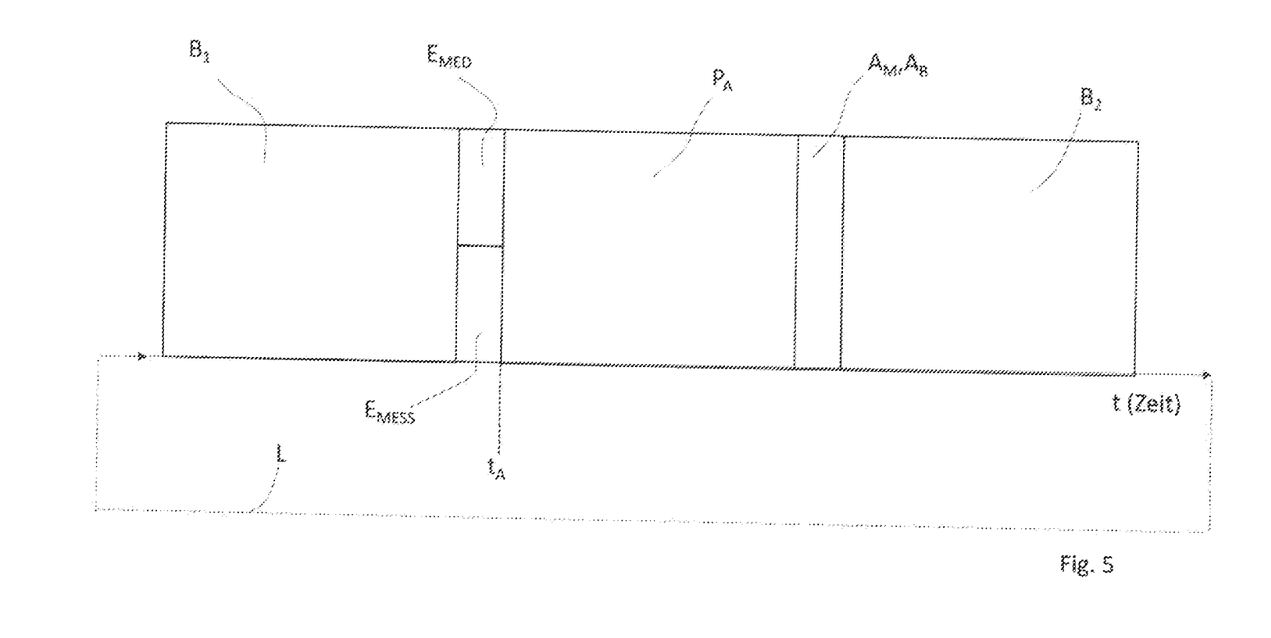
FIG. 5 shows the sequence of the method according to the invention in a schematically depicted time slot.

FIG. 5 shows schematically a time slot for the sequence of a method according to the invention. Firstly the measurement arrangement 4 is operated in a first operating state $B_1$. When a media-induced event $E_{MED}$ occurs, this can for example be the change of the medium 3 or a parameter variation (a changed media concentration, a changed pressure, a changed temperature etc.) or a measurement-dependent event $E_{MESS}$, e.g. a detected fire-like phenomenon 1, the measurement data recorded by the measuring units 11, 12, 13, 14 or stored medium- or environment-specific characteristic data are checked for fulfilment of the adjustment criterion A at a current time point to in a step $P_A$. If the adjustment criterion A is satisfied, an adjustment $A_M$ of a measurement sensitivity $M_1$, $M_2$, $M_3$ or an adjustment $A_B$ of an operating parameter $P_1$, $P_2$, $P_3$ of at least one of the measuring units 11, 12, 13 adequate to the situation can be made using a control means. The apparatus is then operated further in a second operating state $B_2$. As can be seen by means of the dashed line L, the method or described procedure can be repeated again and again.

REFERENCE LIST

1 Fire-like phenomenon
2 Reservoir
3 Medium
4 Measurement arrangement
5 Electromagnetic radiation
6 Optically transparent device
7 Ambient light
8 Checking means
9 Electromagnetic radiation (ambient light)
10 Control means
11 First measuring unit
12 Second measuring unit
13 Third measuring unit
14 Sensor unit
15 Database
15a Database
15b Sensor housing
21 Amplification module
22 Amplification module
30 Alarm system
31 Flame
32 Extinguishing device
33 Extinguishing agent
34 Signal connection
35 Signal connection
36 Conveying direction
A Adjustment criterion
$A_B$ Operating parameter adjustment
$A_M$ Measurement sensitivity adjustment
$B_1$ First operating state
$B_2$ Second operating state
$E_{MESS}$ Event
$E_{MED}$ Event
L Dashed line
$M_1$ Measurement sensitivity
$M_2$ Measurement sensitivity
$M_3$ Measurement sensitivity
N User
$P_A$ Checking for fulfilment of adjustment criterion
$P_1$ Operating parameter
$P_2$ Operating parameter
$P_3$ Operating parameter
$t_A$ Current time point
U Surroundings

The invention claimed is:

1. An apparatus for metrological detection of a fire-like phenomenon, namely a spark, flame or embers or hot particle phenomenon in a reservoir through which media flows or which is loaded with media, comprising a measurement arrangement configured to record measurement data, the measurement arrangement comprising a first and a second measuring unit for the detection of electromagnetic radiation emitted by the fire-like phenomenon in a first or second wavelength range, respectively, and further comprising a computing circuit that is configured to check at a current time point (tA) on the basis of measurement data recorded by the measurement arrangement, whether an adjustment criterion (A) is satisfied, wherein the computing circuit is configured to check measurement data recorded by the first and/or second measuring unit for the presence of radiation absorption of the electromagnetic radiation emitted by the fire-like phenomenon by the medium as the adjustment criterion (A), wherein in the case of a positive determination in this respect, the adjustment criterion (A) is satisfied and a control circuit is configured: a) to switch off the second measuring unit, b) to weaken a measurement sensitivity (M2) of the second measuring unit and c) to increase a measurement sensitivity (M1) of the first measuring unit and d) to adjust, in particular to decrease a threshold value for triggering a danger signal stored in relation to the first measuring unit.

2. An apparatus for metrological detection of a fire-like phenomenon, namely a spark, flame or embers or hot particle phenomenon in a reservoir through which media flows or which is loaded with media, comprising a measurement arrangement configured to record measurement data, the measurement arrangement comprising a first and a second measuring unit for the detection of electromagnetic radiation emitted by the fire-like phenomenon in a first or second wavelength range, respectively, and further comprising a computing circuit that is configured to check at a current time point (tA) on the basis of stored medium or environment specific characteristic data, whether an adjustment criterion (A) is satisfied, the apparatus further comprising a calculation means that is part of the computing circuit or is connected to this by signal technology, wherein the calculation means is configured to calculate, on the basis of stored medium- or environment-specific characteristic data, a probability value for the presence of a radiation absorption of the electromagnetic radiation emitted by a fire-like phenomenon by the medium, wherein the adjustment criterion (A) is a predefined probability value or a probability value range, wherein the computing circuit is configured to check whether the calculated probability value agrees with the predefined probability value or lies in the predefined probability value range, wherein in the case of a positive determination in this respect, the adjustment criterion (A) is satisfied and a control circuit is configured: alto switch off the second measuring unit, b) to weaken a measurement sensitivity (M2) of the second measuring unit and c) to increase a measurement sensitivity (M1) of the first measuring unit and d) to adjust, in particular to decrease a threshold value for triggering a danger signal stored in relation to the first measuring unit.

* * * * *